United States Patent
Shachar et al.

(10) Patent No.: US 12,124,933 B2
(45) Date of Patent: Oct. 22, 2024

(54) ARTIFICIAL INTELLIGENCE SYSTEM FOR ANOMALY DETECTION IN TRANSACTION DATA SETS

(71) Applicant: Actimize LTD., Ra'anana (IL)

(72) Inventors: Amir Shachar, Ramat Gan (IL); Einat Neumann Ben Ari, Hod Hasharon (IL); Danny Butvinik, Haifa (IL); Yoav Avneon, Ness-Ziona (IL); Gabrielle Zaghdoun Azoulay, Tel Aviv (IL); Liat Elboim, Rishon Lezion (IL)

(73) Assignee: ACTIMIZE LTD., Ra'anana (IL)

( * ) Notice: Subject to any disclaimer, the term of this patent is extended or adjusted under 35 U.S.C. 154(b) by 732 days.

(21) Appl. No.: 16/866,139

(22) Filed: May 4, 2020

(65) Prior Publication Data

US 2021/0342847 A1   Nov. 4, 2021

(51) Int. Cl.
*G06N 20/20* (2019.01)
*G06F 21/60* (2013.01)
*G06N 20/00* (2019.01)
*G06Q 20/40* (2012.01)
*G06F 21/62* (2013.01)

(52) U.S. Cl.
CPC ............. *G06N 20/20* (2019.01); *G06N 20/00* (2019.01); *G06Q 20/4016* (2013.01); *G06F 21/60* (2013.01)

(58) Field of Classification Search
CPC . G06Q 20/4016; G06F 21/60; G06F 21/6218; G06N 20/00; G06N 20/20
USPC .......................................................... 705/75
See application file for complete search history.

(56) References Cited

U.S. PATENT DOCUMENTS

| 10,572,877 | B2* | 2/2020 | Aquino | G06Q 20/4016 |
| 10,754,912 | B2* | 8/2020 | Novielli | G06N 20/00 |
| 11,068,942 | B2* | 7/2021 | Briancon | G06N 3/0445 |
| 11,443,380 | B2* | 9/2022 | Cummings | H04L 9/32 |
| 11,824,872 | B1* | 11/2023 | Meyer | G06F 21/6245 |

(Continued)

OTHER PUBLICATIONS

G. F. Cretu, A. Stavrou, M. E. Locasto, S. J. Stolfo, and A. D. Keromytis, "Casting out Demons: Sanitizing Training Data for Anomaly Sensors," in Proceedings of the 2008 IEEE Symposium on Security (Year: 2008).*

(Continued)

*Primary Examiner* — John W Hayes
*Assistant Examiner* — Wodajo Getachew
(74) *Attorney, Agent, or Firm* — Haynes and Boone, LLP (57) ABSTRACT

An artificial intelligence system configured to detect anomalies in transaction data sets. The system includes a processor and a computer readable medium operably coupled thereto, the computer readable medium comprising a plurality of instructions stored in association therewith that are accessible to, and executable by, the processor, to perform modeling operations which include receiving a first data set for training a first machine learning model to detect anomalies in the transaction data sets using a machine learning technique, accessing at least one micro-model trained using at least one second data set separate from the first data set, determining risk scores from the first data set using the at least one micro-model, enriching the first data set with the risk scores, and determining the first machine learning model for the enriched first data set using the machine learning technique.

20 Claims, 5 Drawing Sheets

(56) References Cited

U.S. PATENT DOCUMENTS

| | | | | |
|---|---|---|---|---|
| 2008/0262985 | A1* | 10/2008 | Cretu | G06N 20/00 |
| | | | | 706/59 |
| 2009/0319346 | A1* | 12/2009 | Fogel | G06Q 10/06398 |
| | | | | 706/14 |
| 2018/0053188 | A1* | 2/2018 | Zoldi | G06Q 20/102 |
| 2018/0330268 | A1* | 11/2018 | Ben-Or | G06N 5/02 |
| 2019/0138938 | A1* | 5/2019 | Vasseur | H04L 41/147 |
| 2020/0065812 | A1* | 2/2020 | Walters | G06Q 20/4016 |
| 2020/0279182 | A1* | 9/2020 | So | G06N 20/00 |
| 2021/0065260 | A1* | 3/2021 | Zheng | G06Q 30/0282 |
| 2021/0117830 | A1* | 4/2021 | Inakoshi | G06F 18/2148 |
| 2021/0256429 | A1* | 8/2021 | Gilbertson | G06N 20/00 |
| 2021/0312336 | A1* | 10/2021 | Sinn | G06N 3/084 |

OTHER PUBLICATIONS

M Dictionary (Year: 2022).*
Whalen, Model Aggregation for Distributed Content Anomaly Detection (Year: 2014).*
Hinz Speeding Up the Hyperparameter Optimization of Deep (Year: 2022).*
Intro to Feature Engineering with TensorFlow - Machine Learning Recipes #9 (Year: 2022).*
Shapley Additive Explanations (SHAP) (Year: 2022).*
Kairouz, Advances and Open Problems in Federated Learning (Year: 2021).*
Dry vs Wet Cough Automatic Classification using (Year: 2022).*
Bernhard, Impact of Spatial Frequency Based Constraints on Adversarial Robustness (Year: 2021).*
Managing Data and Information Quality in (Year: 2022).*
Anti-Money Laundering (AML) Solutions _ NICE Actimize (Assignees Website) (Year: 2022).*
Data Annotation_ What it is, Why it matters, and Implementations (Year: 2022).*
Data Enrichment—A Complete Introduction _ Explorium (Year: 2022).*
Data enrichment and machine learning_ Maximizing the value of your data insights (Year: 2022).*
Machine learning—Wikipedia (Year: 2022).*
Ludwig Federated Learning (Year: 2022).*
Difference Between Data Annotation and Labeling _ Difference Between (Year: 2023).*
Feature extraction—Wikipedia (Year: 2023).*
Federated Learning Explained _ AltexSoft (Year: 2022).*
Machine Learning Glossary _ Google Developers (Year: 2023).*
Sevvandi Kandanaarachchi (On normalization and algorithm selection for unsupervised outlier detection) (Fig. 6; p. 21) (Year: 2018).*

* cited by examiner

ARTIFICIAL INTELLIGENCE SYSTEM FOR ANOMALY DETECTION IN TRANSACTION DATA SETS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to detecting anomalous transactions, such as money laundering, fraud, or non-compliant transactions, using an artificial intelligence system, and more specifically to a system and method for training machine learning models to identify the anomalous transactions in transaction data sets using federated transfer learning.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

Anomaly detection in transaction data sets represents a difficult task for modern intelligent systems. Anomalies in transaction data sets may represent money laundering, fraud, or transactions that do not comply with rules, laws, or regulations. However, for a particular entity, such as a bank or other financial entity, data sets for anomalies often contain little to no fraud. These commercial financial entities generally encounter lower rates of fraud or anomalous transaction than in other transaction categories, such as retail transactions. The anomalous transactions in these commercial financial data sets may be important to ensure that the entity is compliant with laws and regulations required for the entity, as well as to minimize risk and loss by the entity.

When training a machine learning model using a data set that includes no or a small number of labels, supervised machine learning models become overfitted as there are only a few anomalous labels (e.g., fraud labels) with potentially thousands to millions of valid transactions. However, unsupervised learning models perform worse and even advanced unsupervised machine learning techniques may be inefficient. When training unsupervised models, the algorithms may introduce a high rate of false positives because the algorithms may look for any anomaly and not labeled transactions. These anomalies may not be indicative of fraud because anomalies may be seldom correlated with fraud. Thus, the false positive rate may be unnecessarily high, which causes the alert review process of anomalous flagged transactions to be difficult and inefficient as the entity would have to review an unreasonable number of alerts. Further, the unsupervised algorithms may lead to models that also include some false negatives that do not correctly detect an anomalous transaction due to fraud.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In order to provide for anomaly detection in data sets for an entity, such as money laundering, fraud, or noncompliant transactions in transaction data sets for a financial entity, an artificial intelligence (AI) system may first require micromodels trained on other data sets and/or using different supervised machine learning (ML) algorithms and techniques. Different financial entities may correspond to banks, trading houses, hedge funds, credit unions, or any other entity that may handle financial records, process transactions, and otherwise provide financial products to others. This may correspond to federated transfer learning where models may be trained on other data sets having transaction features, and then applied to another data set. The AI system may begin by accessing or receiving one or more first data sets that correspond to transactions for a first entity having labeled transactions. The first entity may be the same as, or different than, the entity having the second transaction data set used for modeling the ML model for anomaly detection. However, the first data set(s) may be separate and segregated from the second data set. Additionally, the first data set(s) may correspond to multiple first entities. Although the data set used to train the micromodels may be referred to as a first data set and the data set used to train an ML model for anomaly detection may be referred to as a second data set, it is understood different descriptors and identifiers may be used, including reversal of the numbering. For example, where an AI may first receive a data set, the data set at stake for training of an ML model for anomaly detection, the data set may be referred to as a first data set or a data set at stake. Thereafter, the data set corresponding to a micromodel that may be used for risk score determination with the first received data set may be referred to as a second data set or an auxiliary data set.

The AI system may then apply one or more supervised ML algorithms to the first data set to train one or more micromodels, where each micromodel allows for risk score detection using features from other data sets. The ML algorithm applied to the first data set may correspond to a gradient boosting algorithm, such as XGBoost, a random forest algorithm, or other selected ML algorithm. However, the models using the applied algorithm may be "micromodels" in the sense that the micromodels are not required to be optimized to refine to a fully verified ML model. Thereafter, the second data set for the entity requesting an anomalous transaction detection model may be accessed or received by the AI system. The AI system may then utilize the trained micromodels to generate one or more risk scores for the second data set. The micromodels may only be applied to the subset of features that are available in both the first data set(s) and the second data set. Thereafter, the risk scores are used to enrich the second data set. Prior to enriching the first data set, dimensionality reduction may be conducted on the second data set so that an unsupervised ML algorithm may be applied to the second data set. Once dimensionality reduction is conducted, the second data set may be enriched with the risk scores so that modeling may occur.

The AI system then may determine an unsupervised ML algorithm that may be used to determine an ML model for anomalous transaction detection in the second data set. For example, the unsupervised ML algorithm may correspond to extended isolation forest, variational auto encoder, or one-class support vector machine (SVM), or any combination thereof. However, in further embodiments, other unsupervised ML algorithms may be utilized. The AI system may determine a first model based on the enriched data, as well as a second model based on the unenriched data that does not include the risk scores. Further, fraud enrichment may occur with the micromodels and/or ML models to switch the labels of transactions that may be misclassified. In order to determine the effectiveness and significance of data features for performing analysis and predictions by the two different ML models, a model explanation and comparison may be performed on the two models using a machine learning explainer. SHapley Additive exPlanations (SHAP) and/or Local Interpretable Model-agnostic Explanations (LIME) may be used to obtain a measure of importance of each feature in the classification task of determining whether a transaction is anomalous or not (e.g., flagged or classified as money laundering, fraud, or noncompliant, or otherwise valid). The AI system then obtains a total significance level of each feature for the two ML models and may output the significance level with the ML models.

The embodiments described herein provide methods, computer program products, and computer database systems for an AI system for anomaly detection in transaction data sets. A service provider system may therefore include an anomaly detection system that may access different transaction data sets. The system may then perform micromodeling for risk score determination. Additionally, the system may then enrich data sets and determine one or more ML models for anomalous transaction detection. Once the ML models are generated, model explanations may be provided to output feature importance in classifications by each model.

According to some embodiments, in an AI system accessible by a plurality of separate and distinct organizations, an ML algorithm, and an anomalous transaction detection model is provided for identifying, predicting, and classifying transactions in a data set, thereby optimizing anomalous transaction detection, and providing faster and more precise predictive analysis by AI systems.

Example Environment

Figure 1:
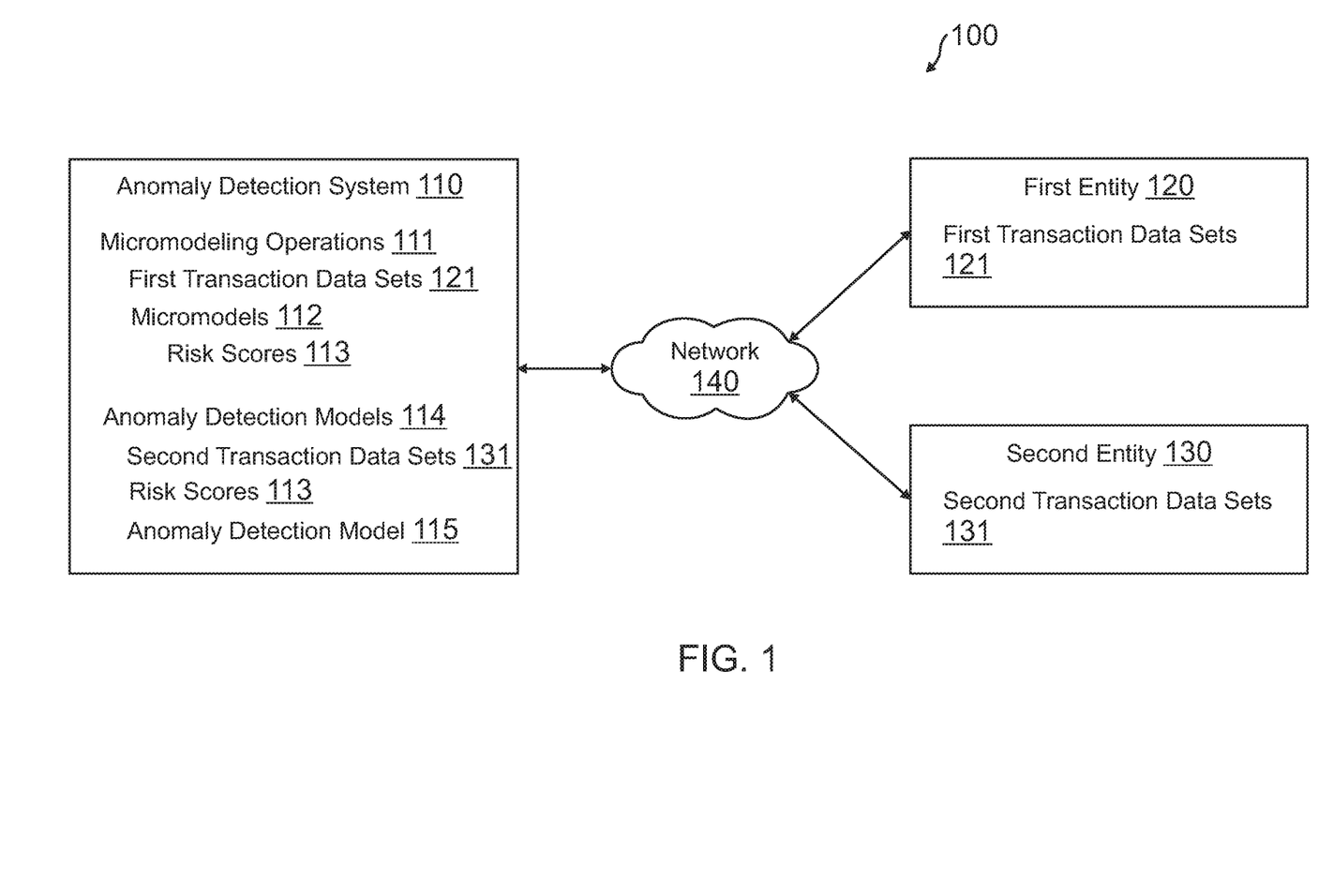
FIG. 1 is a simplified block diagram of a networked environment suitable for implementing the processes described herein according to an embodiment.

The system and methods of the present disclosure can include, incorporate, or operate in conjunction with or in the environment of an ML engine, model and anomalous transaction detection system, which may include an AI computing architecture that is trained using federated transfer learning. FIG. 1 is a block diagram of a networked environment 100 suitable for implementing the processes described herein according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, AI architectures have been developed to improve predictive analysis and classifications by systems in a manner similar to human decision-making, which increases efficiency and speed in performing predictive analysis of anomalous transactions. One or more devices and/or servers may be operated and/or maintained by the same or different entities.

FIG. 1 illustrates a block diagram of an example environment 100 according to some embodiments. Environment 100 may include anomaly detection system 110, a first entity 120, and a second entity 130 that interact to provide intelligent detection of anomalous transactions through training of a machine learning model through federated transfer learning. In other embodiments, environment 100 may not have all of the components listed and/or may have other elements instead of, or in addition to, those listed above. In some embodiments, the environment 100 is an environment in which anomalous transaction detection may be performed through an AI system. As illustrated in FIG. 1, anomaly detection system 110 might interact via a network 140 with first entity 120 and second entity 130, which generates, provides, and provides output explanation for a trained machine learning model.

Anomaly detection system 110 may be utilized in order to determine an ML model for anomalous transaction detection using transaction data sets provided by first entity 120 and second entity 130. Anomaly detection system 110 may first perform micromodeling operations 111 on one or more of first transaction data sets 121 from first entity 120 in order to generate micromodels 112 that may be applied to one or more second transaction data sets 131 from second entity 130. First entity 120 may correspond to a single entity, such as a bank or other financial institution, or may correspond to multiple different entities that provide separate ones of first transaction data sets 121. Additionally, first entity 120 and second entity 130 may, in some embodiments, correspond to the same or different entity having different data sets for training and modeling of an ML model for anomaly detection. Prior to generating one or more micromodels 112 by micromodeling operations 111, anomaly detection system 110 may perform data pre-processing on first transaction data sets 121 and second transaction data sets 131, such as to reduce the data sets' dimensionality. This may include steps such as data cleaning to remove one or more columns and/or features, sampling of training and validation sets, normalizing to reduce the mean and provide missing value imputation, and/or feature engineering of features in the data sets.

Thereafter, micromodeling operations 111 generate and determine one or more micromodels 112 using an ML algorithm and technique. This may correspond to a supervised ML algorithm that includes labeled data and/or classifications, such as gradient boosting (e.g., XGBoost), that is applied to the pre-processed training data from first transaction data sets 112. Additionally, multiple different types of ML algorithms may be used to generate different micromodels. Micromodels 121 are trained to have multiple hyper-parameter settings where instead of optimizing certain hyper-parameters that would be tailored to a data set (e.g., second transaction data sets 131), multiple micromodels are instead trained and selected based on the data set and scenario. These models are generated instead to provide risk scores on the data set at stake (e.g., second transaction data sets 131) for ML modeling for anomaly detection. Thereafter, micromodel evaluation may be performed by applying micromodels 112 to the subset of features that are in common (e.g., the intersection of features) from one or more of first transaction data sets 121 used for micromodels 112 and one or more of second transaction data sets 131 used for ML model generation for anomaly detection in transaction data sets. This provides risk scores 113 for those data sets selected from second transaction data sets 131.

After generating of risk scores 113, these risk scores are used to create an enriched data set for second transaction data sets 131 used for ML modeling of an anomaly detection model 115. This provides federated transfer learning by training models with different federated data sets that are transferred to a "data set at stake" for ML modeling. However, prior to modeling, dimensionality reduction is required for the data sets selected from second transaction data sets 131 for modeling. Thus, after enriching the data sets with risk scores 113, further dimensionality reduction is performed so that the ML algorithm applied to the enriched data sets does not suffer dimensionality issues with a high number of input features. After dimensionality reduction, anomaly detection model 115 may be generated and determined using the selected ML algorithm and technique. When generating anomaly detection model 115, two separate models are generated. One is generated solely on the raw data prior to enriching with risk scores 113. Another model is generated based on the enriched data sets. The ML algorithm may correspond to an unsupervised ML algorithm. In order to understand the models and verify whether the enriched set of features adds value to the anomaly detection model, an ML model explainer may be applied to obtain a measure of importance of each feature in each classification task (e.g., anomalous transaction detection). A total significance level of each feature in the classification task(s) may be obtained and output to view the added value of using the enriched data set.

One or more client devices and/or servers may execute a web-based client that accesses a web-based application for anomaly detection system 110, or may utilize a rich client, such as a dedicated resident application, to access anomaly detection system 110. These client devices may utilize one or more application programming interfaces (APIs) to access and interface with anomaly detection system 110 in order to schedule, review, and revise ML modeling using the operations discussed herein. Interfacing with anomaly detection system 110 may be provided through an application and may be based on data stored by a database, anomaly detection system 110, first entity 120, and/or second entity 130. The client devices might communicate with anomaly detection system 110 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. Communication between the client devices and anomaly detection system 110 may occur over network 140 using a network interface component of the client devices and a network interface component of anomaly detection system 110. In an example where HTTP/HTTPS is used, the client devices might include an HTTP/HTTPS client commonly referred to as a "browser" for sending and receiving HTTP//HTTPS messages to and from an HTTP//HTTPS server, such as anomaly detection system 110 via the network interface component. Similarly, anomaly detection system 110 may host an online platform accessible over network 140 that communicates information to and receives information from the client devices. Such an HTTP/HTTPS server might be implemented as the sole network interface between the client devices and anomaly detection system 110, but other techniques might be used as well or instead. In some implementations, the interface between the client devices and anomaly detection system 110 includes load sharing functionality. As discussed above, embodiments are suitable for use with the Internet, which refers to a specific global internet of networks. However, it should be understood that other networks can be used instead of the Internet, such as an intranet, an extranet, a virtual private network (VPN), a non-TCP/IP based network, any LAN or WAN, or the like.

The client devices may utilize network 140 to communicate with anomaly detection system 110 and/or first entity 120 and second entity 130, which is any network or combination of networks of devices that communicate with one another. For example, the network can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, anomaly detection system 110 is configured to provide webpages, forms, applications, data, and media content to the client devices and/or to receive data from the client devices. In some embodiments, anomaly detection system 110 may be provided or implemented in a cloud environment, which may be accessible through one or more APIs with or without a correspond graphical user interface (GUI) output. Anomaly detection system 110 further provides security mechanisms to keep data secure. Additionally, the term "server" is meant to include a computer system, including processing hardware and process space(s), and an associated storage system and database application (e.g., object-oriented data base management system (OODBMS) or relational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, first entity 120 and second entity 130, shown in FIG. 1, executes processing logic with processing components to provide data used for micromodels 112 and anomaly detection model 115 generation. For example, in one embodiment, first entity 120 and second entity 130 includes application servers configured to implement and execute software applications as well as provide related data, code, forms, webpages, platform components or restrictions, and other information associated with data sets using for micromodel/ML model determination, and to store to, and retrieve from, a database system related data, objects, and web page content associated with anomaly detection in transaction data sets. For example, anomaly detection system 110 may implement various functions of processing logic and processing components, and the processing space for executing system processes, such as running applications for ML modeling. First entity 120 and second entity 130 may be accessible over network 140. Thus, anomaly detection system 110 may send and receive data to one or more of first entity 120 and second entity 130 via network interface components. First entity 120 and second entity 130 may be provided by one or more cloud processing platforms, such as Amazon Web Services® (AWS) Cloud Computing Services, Google Cloud Platform®, Microsoft Azure® Cloud Platform, and the like, or may correspond to computing infrastructure of an entity, such as a financial institution.

Several elements in the system shown and described in FIG. 1 include elements that are explained briefly here. For example, the client devices could include a desktop personal computer, workstation, laptop, notepad computer, PDA, cell phone, or any wireless access protocol (WAP) enabled device or any other computing device capable of interfacing directly or indirectly to the Internet or other network connection. The client devices may also be a server or other online processing entity that provides functionalities and processing to other client devices or programs, such as online processing entities that provide services to a plurality of disparate clients.

The client devices may run an HTTP/HTTPS client, e.g., a browsing program, such as Microsoft's Internet Explorer or Edge browser, Mozilla's Firefox browser, Opera's browser, or a WAP-enabled browser in the case of a cell phone, tablet, notepad computer, PDA or other wireless device, or the like. According to one embodiment, the client devices and all of its components are configurable using applications, such as a browser, including computer code run using a central processing unit such as an Intel Pentium® processor or the like. However, the client devices may instead correspond to a server configured to communicate with one or more client programs or devices, similar to a server corresponding to anomaly detection system 110 that provides one or more APIs for interaction with the client devices in order to submit data sets, select data sets, and perform modeling operations for an AI system configured for anomaly detection.

Thus, anomaly detection system 110, and/or first entity 120 and second entity 130 (as well as any client devices) and all of their components might be operator configurable using application(s) including computer code to run using a central processing unit, which may include an Intel Pentium® processor or the like, and/or multiple processor units. A server for anomaly detection system 110, first entity 120, and/or second entity 130 may correspond to Window®, Linux®, and the like operating system server that provides resources accessible from the server and may communicate with one or more separate user or client devices over a network. Exemplary types of servers may provide resources and handling for business applications and the like. In some embodiments, the server may also correspond to a cloud computing architecture where resources are spread over a large group of real and/or virtual systems. A computer program product embodiment includes a machine-readable storage medium (media) having instructions stored thereon/in which can be used to program a computer to perform any of the processes of the embodiments described herein utilizing one or more computing devices or servers.

Computer code for operating and configuring anomaly detection system 110, first entity 120, and second entity 130 to intercommunicate and to process webpages, applications and other data and media content as described herein are preferably downloaded and stored on a hard disk, but the entire program code, or portions thereof, may also be stored in any other volatile or non-volatile memory medium or device, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Anomaly Detection Model

Figure 2:
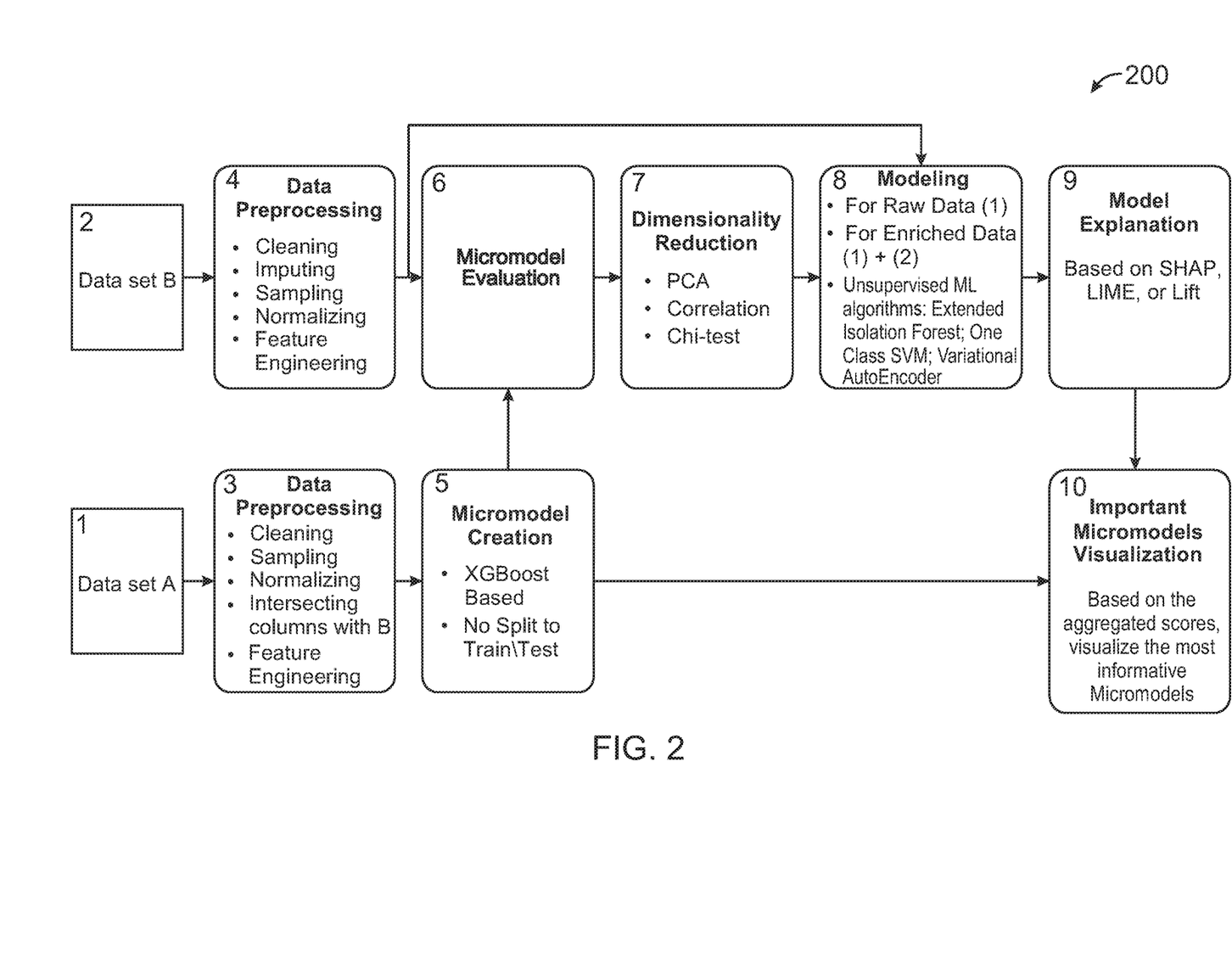
FIG. 2 is a simplified block diagram of an artificial intelligence system that trains a machine learning model for anomaly detection in transaction data sets according to some embodiments.

FIG. 2 is a simplified block diagram of an artificial intelligence system that trains a machine learning model for anomaly detection in transaction data sets according to some embodiments. Environment 200 of FIG. 2 includes a data set A and a data set B, such as those data sets that may be provided by first entity 120 and/or second entity 130 discussed in reference to environment 100 of FIG. 1. In this regard, environment 200 displays data sets, data operations, and ML models utilized by an AI system, such as anomaly detection system 110 from environment 100, for generation of an intelligent model for anomaly detection. Thus, the blocks in environment 200 may be utilized to train an ML model for federated transfer learning.

In block 1, a data set A is accessed, retrieved, or received by an AI system for anomaly detection in transaction data sets. The data set A may correspond to a first auxiliary that is separate and segregated from a data set B that is similarly accessed, retrieved, or received by the AI system in block 2. In order to provide federated transfer learning, segregation and seclusion of the data sets A and B is required so that data sets A and B are not combined, and the micromodels learned from data set A may be applied to data set B. In this regard, data set A may correspond to one or more transaction data sets from one or more first banks, financial entities, or the like. Data set B may correspond to a different bank, financial entity, or the like, or may correspond to the same bank, financial entity, etc. but have different transaction data for data sets A and B. Additionally, while data set A may correspond to a single data set (e.g., where one or more micromodels may be trained), data set A may also include multiple different data sets for generation of further micromodels.

In order to begin modeling operations on both data sets A and B, data pre-processing steps occur at blocks 3 and 4. For example, at block 3, steps of data cleaning, sampling, normalizing, determining intersecting columns between data sets A and B, and feature engineering may occur. Data cleaning may include removing columns which are characterized as zero-variance (meaning, have no more than one unique value), as those may not contribute to the model. Segment-specific feature and row selection may be performed, for example, based on small to mid-sized enterprise (SME) knowledge. When performing segment-specific feature and row selection, commercial features may be removed when focusing on retail transactions, non-monetary transactions may be removed, transaction performed via channels that are not relevant to the specific segment may be removed, other pre-processing may be performed on the data set based on the selected business segment, or any combination thereof. Further, features may be removed that have more than a predefined threshold of unique values. Those features may be considered keys that are too specific to be part of a final model. Absolutely similar or matching columns, duplicate rows, and verbose columns with personally identifiable data may also be removed. Pearson correlation may be applied to any numerical features to eliminate features that are highly correlated with others. Additionally, chi-test may be applied to categorical features to eliminate features that are highly similar with others. Analysis of variance (ANOVA) may finally be applied to each pair of numeric and categorical features in order to remove one feature of the pair that is very similar to its partner.

A sampling step may be performed to make sure, with low occurrence of fraud, money laundering, noncompliance, etc. in transaction data sets, that sufficient anomalous transactions are selected. This is due to the unbalanced nature of large transaction data sets for banks and financial entities. Thus, to reduce imbalance, sampling of the training and validation sets (e.g., not the test set) is conducted where all or a significant portion of the fraudulent, money laundering, non-compliant, or otherwise anomalous transactions are selected with a small amount (e.g., a predefined threshold) of the valid or non-anomalous transactions. Normalizing may also occur where data sets are normalized to reduce their means and then scaled by the standard deviation of each feature. Normalizing may be performed due to two main reasons. First, gradient descent-based algorithms introduce exploding gradients if the features are not normalized. Second, the mean square error (MSE) loss function, when applied by unsupervised algorithms such as variational auto encoder, requires that the features are normalized or else the loss will be biased in favor of features with higher overall values. Further, intersecting columns between A and B are determined to make sure that data set A, after pre-processing, has the same columns as B for use in federated transfer learning. An imputation step may not be required for pre-processing of data set A at block 3 as data set A is used to build a supervised ML micromodel. Thus, a supervised ML algorithm, such as XGBoost, may not require missing value imputation.

Feature engineering may also be applied to data set A at block 3. Different operations may be applied during feature engineering, including expert-based feature engineering, statistical-based feature engineering, lift-based features, date-based features, ratio-based features, and/or natural language processing (NLP)-based features. In expert-based feature engineering, "indicative features" are based on historically aggregated data from whom statistics are being extracted, and according to which anomalies are observed. While anomalies may not necessarily be correlated with fraud, a combination of anomalies may provide an indication for suspicious or fraudulent scenarios. In statistical-based feature engineering, features are encoded according to statistics that are based on their associated bucket. For example, for a given combination of party key and device key, median, standard deviation, and a first quantile of the amount of features are calculated. These values are then added as new features to enrich the specific data set. This may assist in obtaining better results than using the raw data. Those new features allow clustering of similarly behaving features, providing a smart encoding.

With lift-based features, the lift for each of our categorical features' values is calculated. For continuous features, the features are first discretized and then the lift is applied. Lift values, computed for the training data set, then encode the features similarly to statistical-based features encoding the data. However, the lift-based features may be inherently associated with fraud and, thus, features' categories characterized by similar lift values may be correlated with fraud. This allows clustering together to provide indications of fraud. When using date-based features, the difference between dates associated with the same transaction may be calculated, for example, the difference between a time when the account was created and the transaction time. Ratio-based features may also be used where a ratio between features that seem to be business-related is computed. For example, the ratio between the transaction's amount and the balance at the time the transaction took place may be treated as a new feature. Using NLP-based features, features may be verbose, where features that represent meaningful tokens or terms are extracted from those features. These may be converted to one-hot encoded features that provide context and/or meaning to the verbose features. Other feature engineering may also be performed on the features of the data sets A and B.

At block 4, to perform data pre-processing on data set B, steps of cleaning, imputing, sampling, normalizing, and feature engineering may be applied. Additionally, the encoded method to hash categorical features between data set A and data set B may remain consistent in order to ensure comparison of like features and data. Cleaning, sampling, normalizing, and feature engineering may be applied in a similar fashion to those described with respect to block 3. However, an imputation step may be required at block 4, while determining intersecting columns with B is no longer necessary as the operations of block 4 are being performed on data set B. When performing missing values imputation, for each group of records sharing the same entity (such as the party key), a median (for numeric features) and a mode (for categorical features) is calculated. The missing values for values in the corresponding buckets may then be filled based on the aggregated median and mode statistics.

Using the pre-processed data from block 3, at block 5 micromodel creation and determination is performed, such as micromodels 112 generated by micromodeling operations 111 in environment 100 of FIG. 1. When performing micromodel creation block 5, the models may be created using the pre-processed data set A. The models may be created with multiple hyper-parameters settings, where instead of attempting to optimize the best or preferred hyper-parameters that would be selected for a data set at stake (e.g., data set B), multiple micromodels are trained and created. The micromodels are not required to be optimized as the micromodels are later applied to data set B, which is different from data set A. These micromodels may be trained using a supervised ML algorithm and technique, including gradient boosting techniques such as XGBoost. However, since the micromodels may be used in the context of determining risk scores for data set enrichment of data set B, the algorithm used for building and determining the micromodels may vary. Thus, different models may be utilized to extract different patterns.

At block 6, micromodel evaluation may be performed to the subset of features that are available in both data set A and data set B. Thus, the micromodels are applied to the intersection of data set A and data set B so that the subset of features identified from pre-processed data set B is fed into the corresponding micromodels. This allows for obtaining of new features as risk scores, such as risk scores 113 in environment 100. Thereafter, at block 7, dimensionality reduction is further performed. In blocks 3 and 4, feature engineering and data cleaning was required to reduce the dimensionality of data sets A and B. Because addition of the risk scores may include addition of hundreds, if not thousands, of new features, dimensionality reduction may be required so that an unsupervised ML algorithm may be utilized for ML modeling for anomalous transaction detection, as unsupervised ML algorithms may be sensitive to high dimension data sets. Dimensionality reduction techniques may include principle component analysis (PCA), Pearson correlation, and or chi-test techniques.

Utilizing the low dimensionality data, at block 8, the particular ML algorithm and technique is applied to both the raw data (e.g., the unenriched data) and the enriched data, thereby training two separate models. This allows for comparison of the models to determine whether the risk scores provide a better ML model and predictive classification, or if it ends up disrupting the data. The models may be trained using various types of ML algorithms, including unsupervised ML algorithms, for example, extended isolation forest, variational out encoder, and/or one-class SVM. When training, validating, and testing the ML model, as well as optimizing hyper-parameters, the ML model is built and trained using a validation data set and the ML model's hyper-parameters are optimized during that model building. After the ML model is trained and the hyper-parameters are optimized, the ML model may then be tested. After creation of the models, at block 9, model explanation is performed to understand the importance of micromodels and, inside each micromodel, the importance of the features to the micromodels. Thus, after building the models, an ML model explainer, such as an explanation algorithm, may be used to verify the added value of each separate feature. This may include utilizing SHAP or LIME to obtain a measure of importance of each feature in each classification task. Thereafter, an average of those contributions is determined to obtain a total significance level of each feature. Where neither SHAP nor LIME are available for an unsupervised ML algorithm, a lift table based on a model forecast on the test data may be used to provide feature importance.

An exemplary micromodel visualization is provided at block 10. This allows for the aggregated SHAP scores or other information from block 9 to be visualized for the most important micromodels. This may be necessary as micromodel importance between different data sets may vary and thus, the most important micromodel(s) may vary and should be selected for a particular data set. With just providing scalers at block 9, there may not be an understanding of specific feature importance as well as overall feature importance. For example, an IP address may be dynamic and therefore not as important of a feature due to the inability to rely on a single number (e.g., as IP addresses may change). Mathematical formulas to perform the aforementioned steps may include one of more of the following:

$$\text{Pearson correlation: } r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

$$\text{Chi-test: } X^2 = \sum_{i=1}^{k}\frac{(x_i - m_i)^2}{m_i}$$

$$\text{ANOVA: } \begin{aligned} F &= \frac{\text{variance between treatments}}{\text{variance within treatments}} \\ F &= \frac{MS_{Treatments}}{MS_{Error}} = \frac{SS_{Treatments}/(I-1)}{SS_{Error}/(n_T - I)} \end{aligned}$$

$$\text{Lift: lift} = \frac{P(A \cap B)}{P(A) * P(B)}$$

$$\text{Normalization: } z = \frac{x - \mu}{\sigma}$$

$$\text{XGBoost: } \hat{y}_i = \phi(x_i) = \sum_{k=1}^{K} f_k(x_i), f_k \in \mathcal{F}$$

$$\text{Extended isolation forest: } s(x, n) = 2^{-E(h(x))/c(n)}$$

$$\text{Variational auto encoder: } \mathcal{L}(\phi, \theta, x) = D_{KL}(q_\phi(h \mid x) \| p_\theta(h)) - \mathbb{E}_{q_\phi(h|x)}(\log p_\theta(x \mid h))$$

$$\text{One-class SVM: } \min_{r,c} r^2 \text{ subject to, } \|\Phi(x_i) - c\|^2 \leq r^2 \forall i = 1, 2, \ldots, n$$

$$\text{PCA: } w_{(k)} \underset{\|w\|=1}{\arg\max}\left\{\left\|\hat{X}_k w\right\|^2\right\} = \arg\max\left\{\frac{w^T \hat{X}_k^T \hat{X}_k w}{w^T w}\right\}$$

-continued $$SHAP: \varphi_i(v) = \sum_{S \subseteq N \setminus \{i\}} \frac{|S|!(n-|S|-1)!}{n!}(v(S \cup \{i\}) - v(S))$$

The metrics (Precisions and Recall) that may be considered:

$$precision = \frac{|\{relevant\ documents\} \cap \{retrieved\ documents\}|}{|\{retrieved\ documents\}|}$$

$$recall = \frac{|\{relevant\ documents\} \cap \{retrieved\ documents\}|}{|\{relevant\ documents\}|}$$

Figure 3:
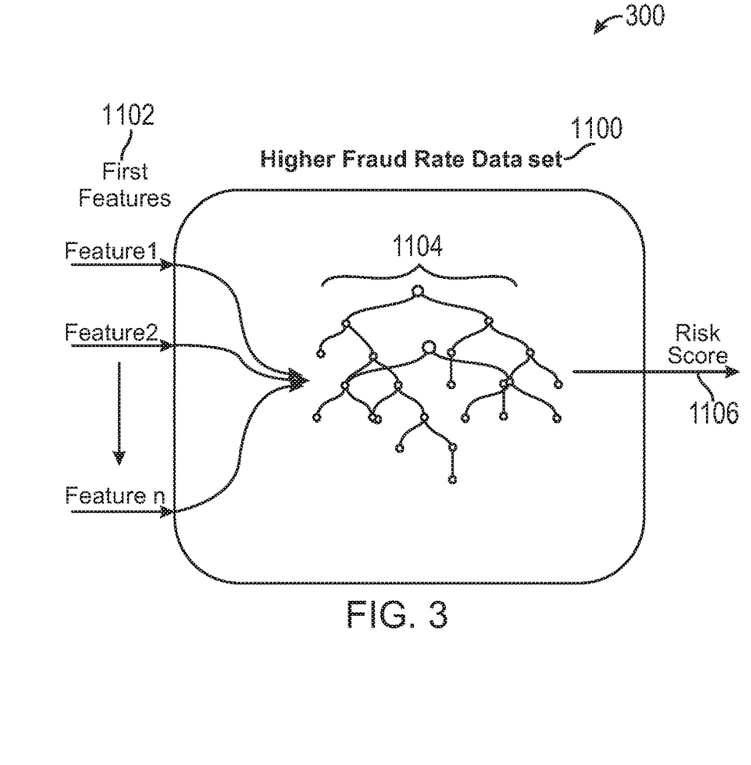
FIG. 3 is a simplified diagram of a machine learning micromodel trained using a machine learning technique on a first entities transaction data according to some embodiments.
Figure 4:
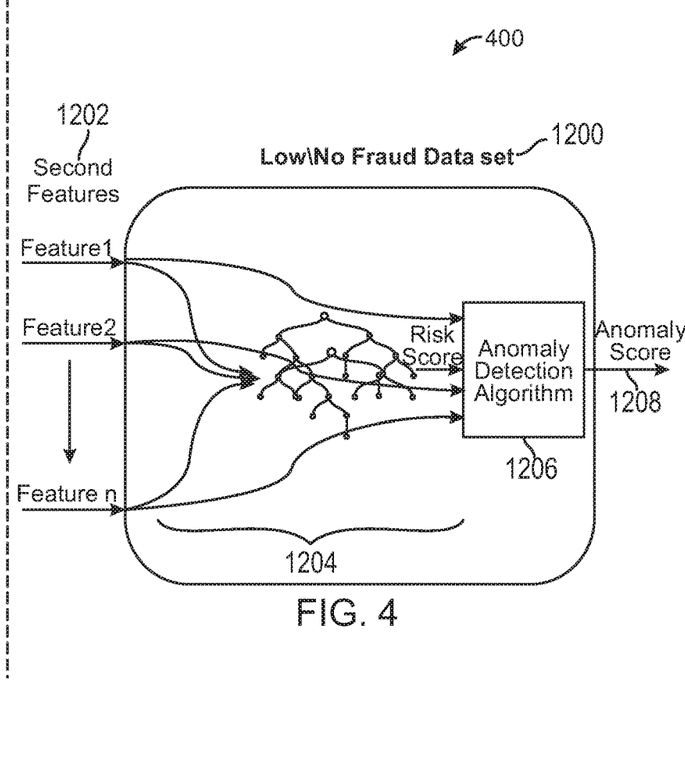
FIG. 4 is a simplified diagram of a machine learning model trained using an enriched data set from micromodel risk scores according to some embodiments.

FIG. 3 is a simplified diagram of a machine learning micromodel trained using a machine learning technique on a first entities transaction data according to some embodiments. FIG. 4 is a simplified diagram of a machine learning model trained using an enriched data set from micromodel risk scores according to some embodiments. In this regard, a model 300 in FIG. 3 shows a micromodel trained based on feature data input to provide a risk score output, while a model 400 in FIG. 4 shows an ML model for trained for anomaly detection using an enriched data set.

For example, a higher fraud rate data set 1100 may correspond to a data set used to train model 300 for risk score determination. High fraud rate data set 1100 may include a sampling of transactions having a high fraud rate or other anomaly with a portion of valid transactions also sampled. In contrast, a relatively lower or no fraud data set 1200 may correspond to a data set used to train an ML model after enriching with one or more risk scores determined from model 300 using low/no fraud data set 1200. As shown in FIGS. 3 and 4, models 300 and 400 may include different layers, such as an input layer, a hidden layer, and an output layer, each having one or more nodes, however, different layers may also be utilized. For model 300, layers 1104 are shown, while for model 400, layers 1204 are shown. For example, models 300 and 400 may include as many hidden layers in layers 1104 and 1204 as necessary or appropriate. Nodes in each layer may be connected to nodes in an adjacent layer. In this example, models 300 and 400 receive a set of input values, first features 1102 and second features 1202 respectively, and produce one or more output values, risk score 1106 and anomaly score 1208 respectively. However, different and/or more outputs may also be provided based on the training. When models 300 and 400 are used to, each node in the input layer may correspond to a distinct attribute or input data type derived from the training data.

In some embodiments, each of the nodes in a hidden layer, when present, generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. The values generated by the hidden layer nodes may be used by the output layer node to produce an output value. When model 300 is used, a risk score 1106 may be output from first features 1102 based on training of layers 1104. When model 400 is used, an anomaly detection algorithm 1206 may be used to provide an anomaly score 1208 based on second features 1202. Models 300 and 400 may be separately trained using training data, where the nodes in the hidden layer may be trained (adjusted) such that an optimal output (e.g., a classification) is produced in the output layer based on the training data. By continuously providing different sets of training data and penalizing models 300 and 400 when the output is incorrect, models 300 and 400 (and specifically, the representations of the nodes in the hidden layer) may be trained (adjusted) to improve performance of models 300, 400 in data classification. Adjusting models 300 and 400 may include separately adjusting the weights associated with each node in the hidden layer.

Figure 5:
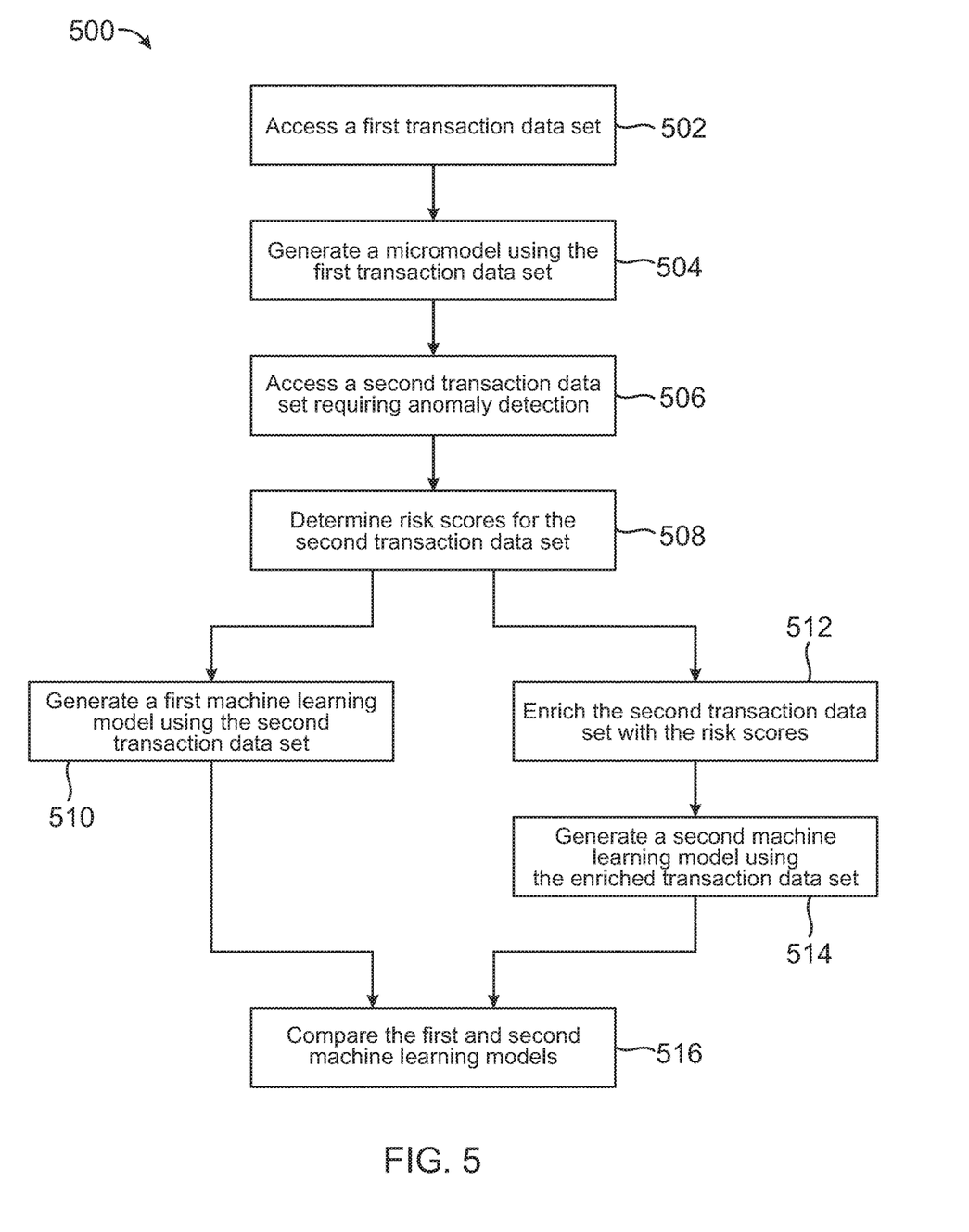
FIG. 5 is a simplified diagram of an exemplary flowchart for an artificial intelligence system for anomaly detection in transaction data sets according to some embodiments.

FIG. 5 is a simplified diagram of an exemplary flowchart for an artificial intelligence system for anomaly detection in transaction data sets according to some embodiments. Note that one or more steps, processes, and methods described herein of flowchart 500 may be omitted, performed in a different sequence, or combined as desired or appropriate. Flowchart 500 of FIG. 5 includes operations for training an AI system in anomaly detection as discussed in reference to FIG. 1-4. One or more of the processes 502-516 of method 500 may be implemented, at least in part, in the form of executable code stored on non-transitory, tangible, machine-readable media that when run by one or more processors may cause the one or more processors to perform one or more of the processes 502-514. In some embodiments, method 500 can be performed by one or more computing devices discussed in environment 100 of FIG. 1.

At step 502, a first transaction data set is accessed, which may correspond to a transaction data set of a first entity or a different transaction data set from a second transaction data set that is at stake for determination of an ML model for anomalous transaction detection using federated transfer learning. Thus, the first data set may correspond to an auxiliary data set that is separate and segregated from the second data set so that proper transfer learning may be applied over federated data sets. Using the first transaction data set, pre-processing may be applied to reduce the dimensionality of the first transaction data set and allow proper processing by an ML algorithm to generate a model, referred to as a micromodel as optimization is not required. Thereafter, at step 504 a micromodel is generated using the first transaction data set. The micromodel may be generated using a supervised ML algorithm or other ML technique. In this regard, the first transaction data set is sampled during pre-processing so that a sufficient number (e.g., all or a significant portion) of anomalous transactions are selected with a small portion of the non-anomalous transactions. This is due to the nature of transaction data sets that have far more non-anomalous transactions than anomalous. The micromodel may be generated using gradient boosting and is not required to be further verified as it is applied to the second transaction data set for risk score determination.

At step 506, a second transaction data set is accessed that requires anomaly detection. In order to perform federated transfer learning, this second transaction data set may be separated and segregated from the first transaction data set, such as by corresponding to different transaction data for the same entity or a different entity. The second transaction data set may have a low, no, or an unknown number of anomalous transactions so that an unsupervised ML algorithm and technique may be required to be applied to detect anomalous scores and/or transactions. However, in order to provide better training of the ML model using the selected algorithm, risk scores for the second transaction data set are determined, at step 508, for example, using the micromodel previously trained from the first transaction data set. Prior to step 508, the second transaction data set may also be pre-processed in order to reduce data set dimensionality for determination of the risk scores. Further, by reducing the dimensionality, the raw data for the second transaction data set may also be used to determine an ML model for the second transaction data set alone (e.g., without enrichment with the risk scores).

Thus, at step 510, a first ML model is generated using the second transaction data set alone, which corresponds to the raw data for the second transaction data set. The model may be generated using a selected ML algorithm, such as an unsupervised machine learning algorithm selected for ML modeling for both the raw and enriched data sets. This raw data set model therefore corresponds to the model that would be generated without enriching the second transaction data set so that determination of whether the enriched data set leads to a better ML model for anomaly detection may be performed. At step 512, the second transaction data set is enriched with the risk scores, such as by adding the risk scores to the columns and data for the second transaction data set after pre-processing. With addition of the risk scores to the second transaction data set, further dimensionality reduction may be performed to allow for better training of the ML model using the enriched data set (e.g., to allow better performance of an unsupervised ML algorithm when training an ML model using the enriched data set).

Thereafter, at step 514, a second ML model is generated using the enriched transaction data set. The second ML model is generated using the same ML algorithm to allow for comparison of the first ML model trained using the raw data set and the second ML model trained using the enriched data set. Thus, at step 516, the first and second ML models are compared. An ML model explainer may be used to determine an added value of each feature to the ML models' classifications, such as a measure of importance of each feature in the classification tasks. This may be done using SHAP, LIME, or a lift ratio per each feature separately. Thereafter, an administrator may determine whether the risk scores used to enrich the data set provide a more accurate ML model for anomaly detection based on the comparison and feature importance.

As discussed above and further emphasized here, FIGS. 1, 2, 3, 4, and 5 are merely examples of anomaly detection system 110 and corresponding methods for anomaly detection using federated transfer learning for training of an AI system, which examples should not be used to unduly limit the scope of the claims. One of ordinary skill in the art would recognize many variations, alternatives, and modifications.

Figure 6:
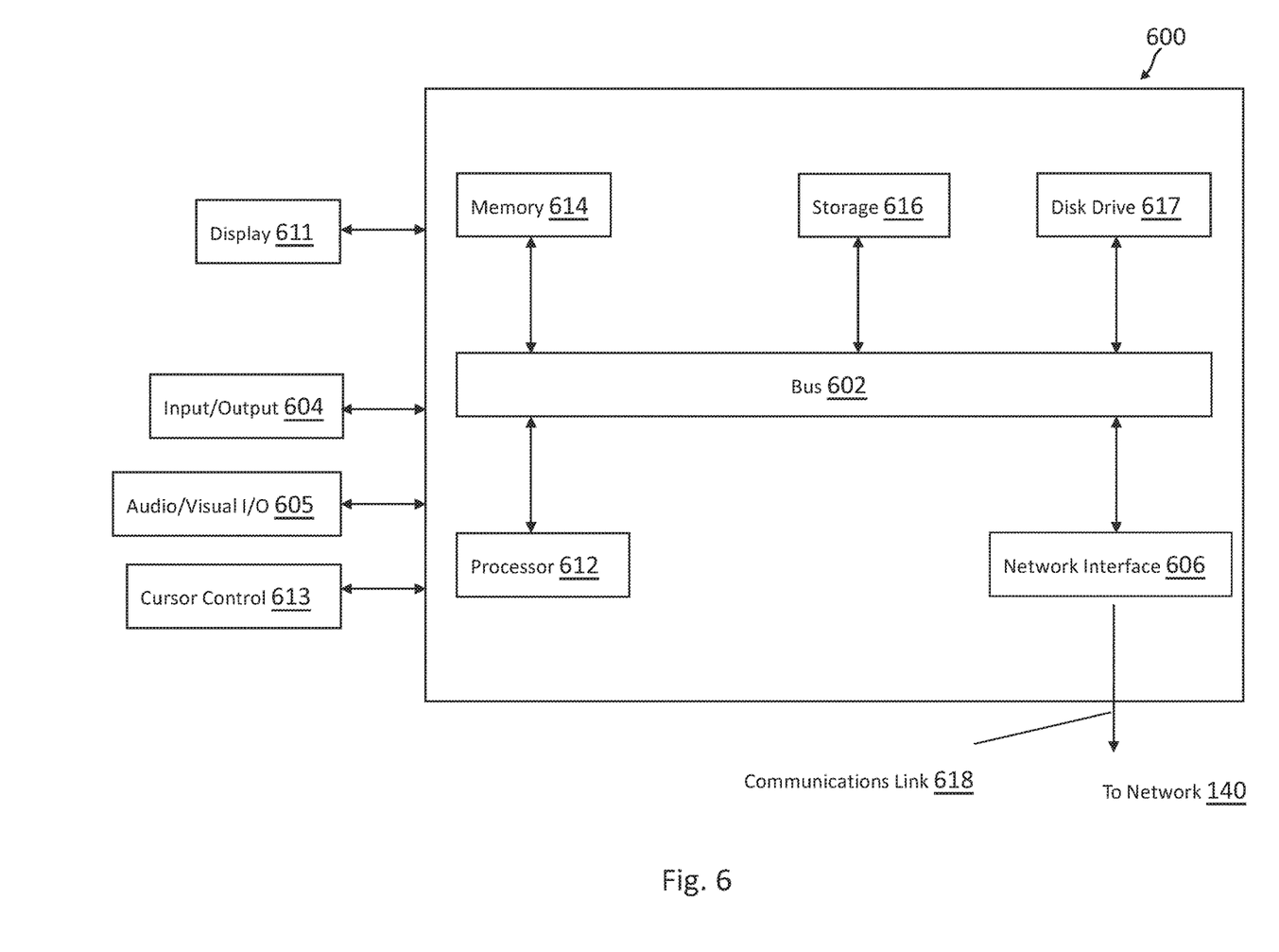
FIG. 6 is a simplified diagram of a computing device according to some embodiments.

FIG. 6 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio/visual input/output component 605 may also be included to allow a user to use voice for inputting information by converting audio signals. Audio/visual I/O component 605 may allow the user to hear audio, and well as input and/or output video. A transceiver or network interface 606 transmits and receives signals between computer system 600 and other devices, such as another communication device, service device, or a service provider server via network 140. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. An artificial intelligence system configured to detect anomalies in transaction data sets, the artificial intelligence system comprising:
    a processor and a non-transitory computer readable medium operably coupled thereto, the non-transitory computer readable medium comprising a plurality of instructions stored in association therewith that are accessible to, and executable by, the processor, to perform modeling operations which comprise:
        receiving a first data set for an unsupervised training of a first machine learning model to detect anomalies in the transaction data sets using a machine learning technique, wherein a first number of the anomalies in the first data set corresponds to a low fraud scenario having less than a second number of the anomalies in at least one second data set that is required for the unsupervised training;
        training, by machine learning (ML) modeling operations, a plurality of micro-models having a plurality of hyper-parameter settings using a supervised training based on the at least one second data set, wherein each of the plurality of micro-models are trained having a corresponding one of a plurality of hyper-parameter settings without a hyper-parameter optimization for a corresponding one of the at least one second data set used during model training, and wherein the first machine learning model is to be trained with the hyper-parameter optimization for the first data set;
        computing micro-model importances of the plurality of micro-models based on individual and overall feature importance scores for the plurality of micro-models;
        selecting at least one micro-model from the plurality of micro-models for the first data set based on the micro-model importances;
        determining a set of intersecting features from first features of the first machine learning model and second features of the at least one micro-model;
        reducing a first dimensionality of the first features from the first data set based on the set of intersecting features;
        determining risk scores for the first features having the reduced first dimensionality from the first data set using the at least one micro-model;
        enriching the first data set with the risk scores based on the set of intersecting features, wherein the enriching includes tagging data for the set of intersecting features in the first data set based on the risk scores, and wherein the enriching of the first data set with the risk scores allows for the unsupervised training of the first machine learning model with the enriched first data set;
        training, by the ML modeling operations, the first machine learning model using the enriched first data set and the machine learning technique, wherein the first machine learning model is trained with the hyper-parameter optimization; and
        detecting fraud corresponding to the anomalies in further transaction data sets using the trained first machine learning model.

2. The artificial intelligence system of claim 1, wherein the modeling operations further comprise:
    training, by the ML modeling operations, a second machine learning model for the first data set using the machine learning technique, wherein the second machine learning model is for an unenriched data set corresponding to the first data set.

3. The artificial intelligence system of claim 2, wherein the modeling operations further comprise:
    generating a model explanation output based on the first machine learning model and the second machine learning model, wherein the model explanation output comprises a comparison between each feature of each classification task within the first machine learning model and the second machine learning model.

4. The artificial intelligence system of claim 3, wherein generating the model explanation output comprises:
    obtaining an importance ranking of each feature in each classification task of the first machine learning model and the second machine learning model; and
    averaging the importance ranking of each feature to each classification task to obtain the comparison.

5. The artificial intelligence system of claim 1, wherein, before training the at least one micro-model, the modeling operations further comprise:
    receiving the at least one second data set for the at least one micro-model, wherein the first data set and each of the at least one second data set comprise segregated data sets for a federated training system, and wherein the at least one second data set comprises at least one auxiliary data set.

6. The artificial intelligence system of claim 5, wherein the risk scores are determined based on the set of intersecting features between the first data set and the at least one second data set for the at least one micro-model.

7. The artificial intelligence system of claim 5, wherein, before training the at least one micro-model, the modeling operations further comprise:
    pre-processing the at least one second data set to reduce a second dimensionality of the at least one second data set, wherein the at least one micro-model is generated using the supervised training with a sampled data set comprising a subset of data from the pre-processed at least one second data set including one or more anomalous transactions and one or more valid transactions within the pre-processed at least one second data set.

8. The artificial intelligence system of claim 5, wherein each of the at least one micro-model is trained using one of a different algorithm corresponding to the supervised training or a different data set from the at least one second data set.

9. The artificial intelligence system of claim 1, wherein the first data set comprises a first transaction data set associated with a first financial entity, wherein the at least one second data set comprises at least one second transaction data set associated with at least one second financial entity, and wherein the first data set comprises an unannotated data set associated with potential fraudulent transactions.

10. A method to detect anomalies in transaction data sets, the method comprising:
   receiving a first data set for an unsupervised training of a first machine learning model to detect anomalies in the transaction data sets using a machine learning technique, wherein a first number of the anomalies in the first data set corresponds to a low fraud scenario having less than a second number of the anomalies in at least one second data set required for an unsupervised training of the first machine learning model using the machine learning technique;
   training, by machine learning (ML) modeling operations, a plurality of micro-models having a plurality of hyper-parameter settings using a supervised training based on the at least one second data set, wherein each of the plurality of micro-models are trained having a corresponding one of a plurality of hyper-parameter settings without a hyper-parameter optimization for a corresponding one of the at least one second data set used during model training, and wherein the first machine learning model is to be trained with the hyper-parameter optimization for the first data set;
   computing, using a processing component of the ML modeling operations for an ML model explainer, micro-model importances of the plurality of micro-models based on individual feature importance scores and an overall feature importance score for each of the plurality of micro-models;
   selecting at least one micro-model from the plurality of micro-models for the first data set based on the micro-model importances;
   determining a set of intersecting features from first features of the first machine learning model and second features of the at least one micro-model;
   reducing a first dimensionality of the first features from the first data set based on the set of intersecting features;
   determining risk scores for the first features having the reduced first dimensionality from the first data set using the at least one micro-model;
   enriching the first data set with the risk scores based on the set of intersecting features, wherein the enriching includes tagging data for the set of intersecting features in the first data set based on the risk scores, and wherein the enriching of the first data set with the risk scores allows for the unsupervised training of the first machine learning model with the enriched first data set;
   training, by the ML modeling operations, the first machine learning model using the enriched first data set and the machine learning technique, wherein the first machine learning model is trained with the hyper-parameter optimization; and
   detecting fraud corresponding to the anomalies in further transaction data sets using the trained first machine learning model.

11. The method of claim 10, further comprising:
   training, by the ML modeling operations, a second machine learning model for the first data set using the machine learning technique, wherein the second machine learning model is for an unenriched data set corresponding to the first data set.

12. The method of claim 11, further comprising:
   generating a model explanation output based on the first machine learning model and the second machine learning model, wherein the model explanation output comprises a comparison between each feature of each classification task within the first machine learning model and the second machine learning model.

13. The method of claim 12, wherein generating the model explanation output comprises:
   obtaining an importance ranking of each feature in each classification task of the first machine learning model and the second machine learning model; and
   averaging the importance ranking of each feature to each classification task to obtain the comparison.

14. The method of claim 10, wherein, before training the at least one micro-model, the method further comprises:
   receiving the at least one second data set for the at least one micro-model, wherein the first data set and each of the at least one second data set comprise segregated data sets for a federated training system, and wherein the at least one second data set comprises at least one auxiliary data set.

15. The method of claim 14, wherein the risk scores are determined based on the set of intersecting features between the first data set and the at least one second data set for the at least one micro-model.

16. The method of claim 14, wherein, before training the at least one micro-model, the method further comprises:
   pre-processing the at least one second data set to reduce a second dimensionality of the at least one second data set, wherein the at least one micro-model is generated using the supervised training with a sampled data set comprising a subset of data from the pre-processed at least one second data set including one or more anomalous transactions and one or more valid transactions within the pre-processed at least one second data set.

17. The method of claim 14, wherein each of the at least one micro-model is trained using one of a different algorithm corresponding to the supervised training or a different data set from the at least one second data set.

18. The method of claim 10, wherein the first data set comprises a first transaction data set associated with a first financial entity, wherein the at least one second data set comprises at least one second transaction data set associated with at least one second financial entity, and wherein the first data set comprises an unannotated data set associated with potential fraudulent transactions.

19. A non-transitory computer-readable medium having stored thereon computer-readable instructions executable to detect anomalies in transaction data sets based on one or more machine learning models, the computer-readable instructions executable to perform modeling operations which comprises:
   receiving a first data set for an unsupervised training of a first machine learning model to detect anomalies in the transaction data sets using a machine learning technique, wherein a first number of the anomalies in the first data set corresponds to a low fraud scenario having less than a second number of the anomalies in at least one second data set required for an unsupervised training of the first machine learning model using the machine learning technique;

training, by machine learning (ML) modeling operations, a plurality of micro-models having a plurality of hyper-parameter settings using a supervised training based on the at least one second data set, wherein each of the plurality of micro-models are trained having a corresponding one of a plurality of hyper-parameter settings without a hyper-parameter optimization for a corresponding one of the at least one second data set used during model training, and wherein the first machine learning model is to be trained with the hyper-parameter optimization for the first data set;

computing, using a processing component of the ML modeling operations for an ML model explainer, micro-model importances of the plurality of micro-models based on individual feature importance scores and an overall feature importance score for each of the plurality of micro-models;

selecting at least one micro-model from the plurality of micro-models for the first data set based on the micro-model importances;

determining a set of intersecting features from first features of the first machine learning model and second features of the at least one micro-model;

reducing a first dimensionality of the first features from the first data set based on the set of intersecting features;

determining risk scores for the first features having the reduced first dimensionality from the first data set using the at least one micro-model;

enriching the first data set with the risk scores based on the set of intersecting features, wherein the enriching includes tagging data for the set of intersecting features in the first data set based on the risk scores, and wherein the enriching of the first data set with the risk scores allows for the unsupervised training of the first machine learning model with the enriched first data set;

training, by the ML modeling operations, the first machine learning model using the enriched first data set and the machine learning technique, wherein the first machine learning model is trained with the hyper-parameter optimization;

detecting fraud corresponding to the anomalies in further transaction data sets using the trained first machine learning model.

20. The non-transitory computer-readable medium of claim 19, wherein the modeling operations further comprise:

training, by the ML modeling operations, a second machine learning model for the first data set using the machine learning technique, wherein the second machine learning model is for an unenriched data set corresponding to the first data set; and generating a model explanation output based on the first machine learning model and the second machine learning model, wherein the model explanation output comprises a comparison between each feature of each classification task within the first machine learning model and the second machine learning model, and wherein the risk scores are determined based on the set of intersecting features between the first data set and the at least one second data set for the at least one micro-model, and wherein the at least one second data set comprises at least one auxiliary data set.

* * * * *